United States Patent [19]

Marshall

[11] Patent Number: 5,097,455

[45] Date of Patent: Mar. 17, 1992

[54] ENHANCED FOCUS SENDING IN OPTICAL INFORMATION STORAGE SYSTEMS

[75] Inventor: Daniel R. Marshall, Boise, Id.

[73] Assignee: Hewlett-Packard Company, Palo Alto, Calif.

[21] Appl. No.: 475,628

[22] Filed: Feb. 6, 1990

[51] Int. Cl.$^5$ .............................................. G11B 7/00
[52] U.S. Cl. ............................ 369/44.14; 250/201.5; 369/44.41
[58] Field of Search ................... 369/13, 44.14, 44.41, 369/110; 360/114; 250/201.5

[56] References Cited

U.S. PATENT DOCUMENTS 4,764,912 8/1988 Ando et al. ...................... 369/44.32

Primary Examiner—Robert L. Richardson

[57] ABSTRACT

A method and apparatus for detecting the focus of a beam of light directed onto grooved optical media, wherein light reflected from said media has a number of orders of reflection forming a sheared interferogram, and wherein overlapping regions are generated between said orders of reflection in said interferogram, is shown to include a light receiving member for receiving light reflected from the media and for directing the light onto a detector member for detecting differences in the brightness of light across the overlapping regions. The detecting member is shown to include, a first photosensitive member for detecting the brightness of light in a portion of the overlap region between the zeroth and first order reflections, a second photosensitive member for detecting the brightness of light in the remainder of the overlap region between the zeroth and first order reflections, and a comparator for comparing the brightness detected between the portion and the remainder of the overlap region.

12 Claims, 2 Drawing Sheets

A     B     C

ENHANCED FOCUS SENDING IN OPTICAL INFORMATION STORAGE SYSTEMS

FIELD OF THE INVENTION

The present invention relates to the field of magneto-optical information storage systems and more particularly to devices utilized in such systems for so-called track following and focusing.

BACKGROUND OF THE INVENTION

Information storage systems, particularly computer memory systems, typically store data magnetically or optically onto several types of media, such as rotating disks. Data stored on such disks, whether magnetic or optical, is contained within a series of tracks. Once formed on a disk, such tracks are typically spiral or concentric shaped and can number up to several thousand tracks on each side of a disk, depending on the diameter of the disk utilized and whether the information is recorded magnetically or optically. The tracks on a disk can be viewed as roughly analogous to grooves on a phonograph record.

In magnetic recording and magneto-optical recording, information is stored on a subject media by orienting the magnetic field of the media at given points along given tracks. In order to access or read data stored on a disk, a so-called head or transducer is moved along a generally radial path across the surface of the disk as the disk is spinning. The generally radial movement will either follow a straight line path or an arcuate path, depending on whether a linear or rotary actuator is used for positioning the head.

In magneto-optic storage, similar to magnetic recording, information is encoded and stored in a sequence of bits defined by magnetic domains oriented normal to the media surface in either of two possible orientations, either north-pole-up or north-pole-down, for example. A blank disc, i.e. an erased track, has all of its magnetic poles oriented in one direction. On magneto-optic media the magnetic force required to flip one magnetic domain from, for example, north-pole-down to north-pole-up, i.e., the coercive force, varies greatly with temperature. At room temperature, the coercive force necessary to flip the magnetic media is so high that an ordinary magnet is too weak. At approximately 150'C, the coercive force required to flip a domain decreases substantially (200-450 Oe) and a bit can be recorded using ordinary magnets including electromagnetics.

During a recording operation in a magneto-optic system, a focused laser beam is used to heat selected spots on the media near a relatively large electro-magnet. In this way, a point on the media can be heated, lowering the coercive force required to write a bit of information and the magnet, depending on the direction of flux generated by such magnet, can record the desired bit. Once the laser beam is turned off, the previously heated point on the media cools "freezing" the oriented media in the desired orientation. To erase information so recorded, the process need only be reversed, that is the point on the media will be heated by the laser beam and the direction of flux generated by the magnet will be such to re-orient media based north magnetic poles in a single orientation.

Referring to FIG. 1, a more graphical interpretation of the above magneto-optical system will be described. A magneto-optical disk 10 is depicted with a small portion of disk 10 enlarged and presented in perspective. Those skilled in the art will recognize that a transparent substrate layer, normally present on disk 10, has not been shown. The enlarged portion 12 is shown to have a magneto-optic layer 14 which overlays an encapsulation layer 16. Had the transparent layer been depicted, it would have overlayed magneto-optic layer 14. Disk portion 12 is shown to have a series of concentric tracks 18a, 18b, 18c and 18d. The tracks are depicted as raised having a valley or groove 20 therebetween.

Reading information recorded on a magneto-optic disc is achieved solely through electro-optical means. A lower power light beam from laser diode 22 is collimated by lens 24 passed through a polarization or "leaky" beam splitter 26a and focused by lens 28 onto track 18b. Depending on the type of media utilized, the laser light beam may be either reflected from magneto-optic layer 14 or transmitted through the layer and, respectively, is read from either above or below the media. Because of phenomena known as the Kerr magneto-optical effect and the Faraday effect, light reflected from the media (Kerr) or transmitted through the media (Faraday) will have a slightly different polarization state than the incident light focused onto the media. The change in polarization state will, typically, comprise rotation of the plane of polarization of linearly polarized light and introduction of ellipticity depending on the orientation of the media at that point.

As shown in FIG. 1, light reflected from track 18b is collimated by lens 28 and reflected by polarization beam splitter 26a to amplitude beam splitter 26b. Beam splitter 26b divides the polarized light into first and second beams for differential detection purposes. The first beam is focused by positive servo lens 29a onto the surface of detector 30a. The second beam is focused by analyser 29b onto the surface of detector 30b. See generally Freese, Robert P., "Optical disks become erasable", IEEE Spectrum, February, 1988, pages 41-45. In differential detection the electrical signals generated by detectors 29a and 29b are subtracted.

As will be appreciated from the above, when reading or writing information onto a magneto-optical disk or any optical disk, it will be necessary to maintain the positioning of the light beam focused by lens 28 on track 18b as disk 10 rotates. Such an operation is known as track following. Track following requires the generation of a radiel position error signal. It will also be appreciated from the above that because relatively small magnetic domains will be recorded, read and erased, it is important to maintain a focused beam of light on the desired track. Maintaining the focus of the light beam requires the generation of a focus axial error signal. Each of these signals, the position error signal and the focus error signal, are calculated based on signals generated by detector 30.

Light reflected from grooved disk 10 and directed onto detector 30 will form a sheared interferogram. When light is focused on a spot on grooved media, such as that used in optical and magneto-optical disks, the reflected light contains a series of orders of reflection each having an axis deviated from the central axis. These reflection orders overlap producing the sheared interferogram. A sheared interferogram is directed onto a detector, such as detector 30. When sampled properly, the detected sheared interferogram can be used to generated the radial position error signal and the focus error signal. The ability to calculate these error signals is based upon the properties of the sheared interferogram in relation to focus and radial position.

The sheared interferogram generated by the magneto-optical system shown in FIG. 1, is depicted in FIG. 2 on detector 30. The sheared interferogram is shown to include the zero order reflection 32 and a portion of the first order reflections 34 and 36. As shown, the first order reflections just "touch" in the center of the zero order reflection 32. In relation to the position of the focused beam of light on track 18b, the configuration of the sheared interferogram will remain basically the same, i.e., the first order reflections will just "touch" in the center of the zero order reflection. However, the light and dark areas associated with the sheared interferogram will change. Since the focused light in FIG. 1 is shown to be "on-track" with respect to track 18b, the sheared interferogram of FIG. 2 is depicted as having equally dark regions in the areas of overlap between the zero order and first order reflections. As the beam of light is moved radially across disk 10, the shading in the sheared interferogram shown in FIG. 2 will change. Referring to FIG. 3, there is shown the changes in the shading of the sheared interferogram as the beam of light focused by lens 28 onto disk 10 is moved radially.

FIG. 3a shows a sheared interferogram which indicates that the light focused by lens 28 has moved radially inwardly in relation to disk 10 such that it is in the region of edge 38, shown in FIG. 1. In such a location, it will be seen that overlap portion 34 is dark shaded while overlap 36 has no shading. Referring now to FIG. 3b, the beam of light focused by lens 28 has moved still further radially inwardly such that it is now positioned in groove 20. As shown in FIG. 3b, overlap portions 34 and 36 are equally shaded, indicating that the beam of light is located in a central location. FIG. 3c depicts a sheared interferogram which is representative of the beam of light focused by lens 28 being located in the region of edge 40. When the focused light is in such a position, the sheared interferogram shows overlap portion 34 as having no shading and overlap portion 36 as having shading. Knowing the properties of the sheared interferogram in relation to the positioning of the focused beam of light, one can utilize detector 30 to generate a radial position error signal.

Referring back to FIG. 2, it will be seen that detector 30 is actually a combination of four detectors, each having photosensitive surfaces. Each of the four detectors will generate a signal indicative of the intensity of the light on its surface. Each of the four detectors has been designated A, B, C and D. The radial position error system is generated by adding and subtracting signals generated by these detectors. In accordance with the detectors shown in FIG. 2, the position error signal (PE) can be determined according to the following formula:

$$PE = B - C$$

In order to determine focus, detector 30 in effect senses the diameter of the illuminated spot, including the sheared interferogram. Accordingly, focus is determined in effect by sensing the size of the spot formed by the intersection of the detector with the converging beam. As shown in FIG. 2, focus is determined by amplifier 42 in accordance with the following formula:

$$FE = (A+D) - (B+C)$$

where FE is the focus error signal.

It will be noted that detector 30 is known as an "I" type detector. In addition to the I type detector, quadrant type detectors have also been proposed for use in determining position error signals and focus error signals. See for example, U.S. Pat. Nos. 4,773,053 - Gottfried, 4,797,868 - Ando and 4,779,250 Kogure, et al.; and Lee, Wai-Hon, "Optical Technology For Compact Disk Pickups", Lasers and Optronics, pp. 85–87 (September 1987).

Although the above described devices for generating position error and focus error signals are generally adequate, they do exhibit problems where fine focusing is required. It is apparent from the above that utilizing a focused spot of light has an advantage high-density of information storage. It has been estimated that the theoretical upper limit of the storage capacity of magneto-optical systems can be as high as 300 megabits per square inch of media. In practical terms, on a 5.25 inch floppy disk, yields of approximately 400 to 800 megabits can be expected. The problem associated with utilizing a strongly converging cone of light is the inherent shallow in-focus region. Typically, the focused region for the cone of light utilized in optical information storage systems is on the order of one micrometer. The above described devices, although generally acceptable, cannot maintain a precisely focused spot within this one micrometer focused region, but suffer from inadequate sensitivity in some cases. Consequently, a need still remains for a detector which is capable of not only providing position error information but also of providing focus error information which can be used to coarsely focus the light beam and thereafter fine focus the light beam.

SUMMARY OF THE INVENTION

The advantages of the invention are achieved in a method and apparatus for detecting the focus of a beam of light directed onto grooved optical media, wherein light reflected from said media has a number of orders of reflection forming a sheared interferogram, and wherein overlapping regions are generated between said orders of reflection in said interferogram, is shown to include a light receiving member for receiving light reflected from the media and for directing the light onto a detector member for detecting differences in the brightness of light across the overlapping regions. The detecting member is shown to include, a first photosensitive member for detecting the brightness of light in a portion of the overlap region between the zero and first order reflections, a second photosensitive member for detecting the brightness of light in the remainder of the overlap region between the zero and first order reflections, and a differential amplifier for comparing the brightness detected between the portion and the remainder of the overlap region.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which.

DETAILED DESCRIPTION OF THE PREFERRED EMBODIMENT

Figure 1:
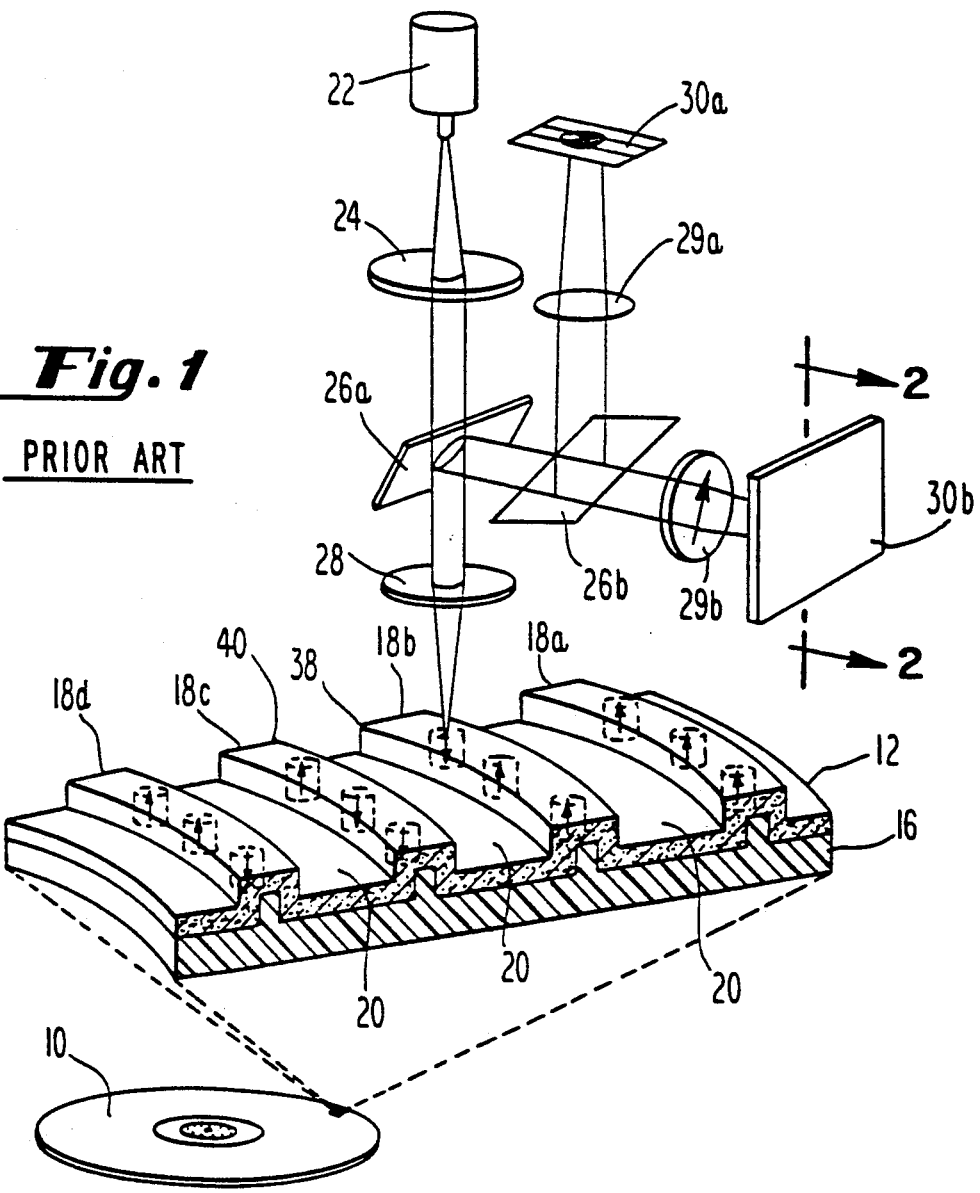
FIG. 1 is a perspective view of a prior art magneto-optical information storage system.
Figure 6:
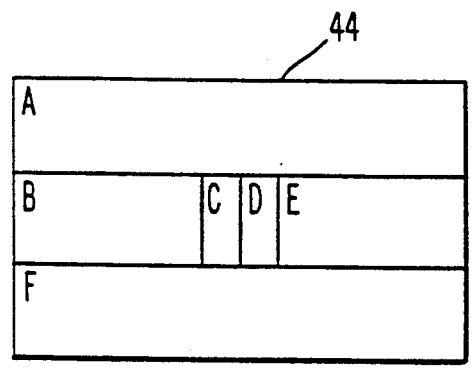
FIG. 6 is an alternative view of the servo detector shown in FIG. 5 wherein the interferogram has been removed.

A new and novel detector for detecting the focus of a beam of light directed on a grooved optical media is shown in FIG. 6 and designated 44. It will be noted that detector 44 is designed for substitution in the system shown in FIG. 1, wherein detector 44 is substituted for detector 30. So substituted, it will be seen that detector 44 acts in conjunction with the light receiving members, lens 28 and leaky beam splitter 26, to have the interferograms directed thereon. In other words, detector 44 is positioned to receive light from leaky beam splitter 26. In its broadest scope, detector 44 detects differences in the brightness of light across the overlapping regions in the interferograms.

Figure 2:
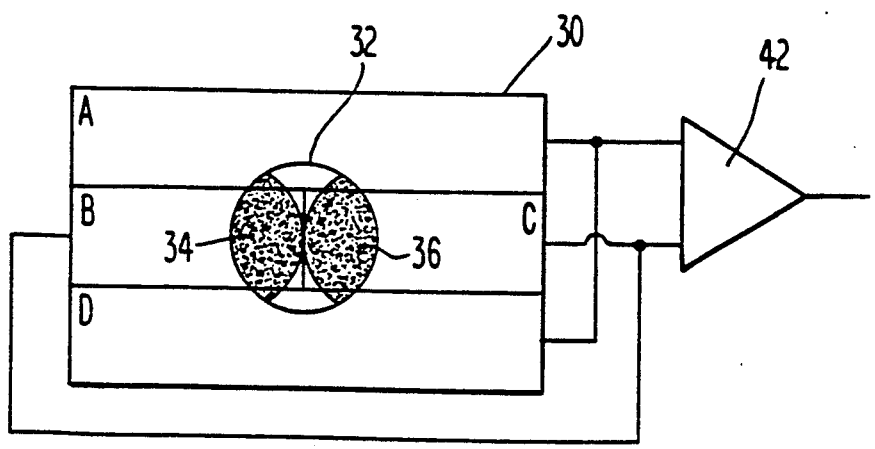
FIG. 2 is a section view along the line 22 of FIG. 1.
Figure 3:
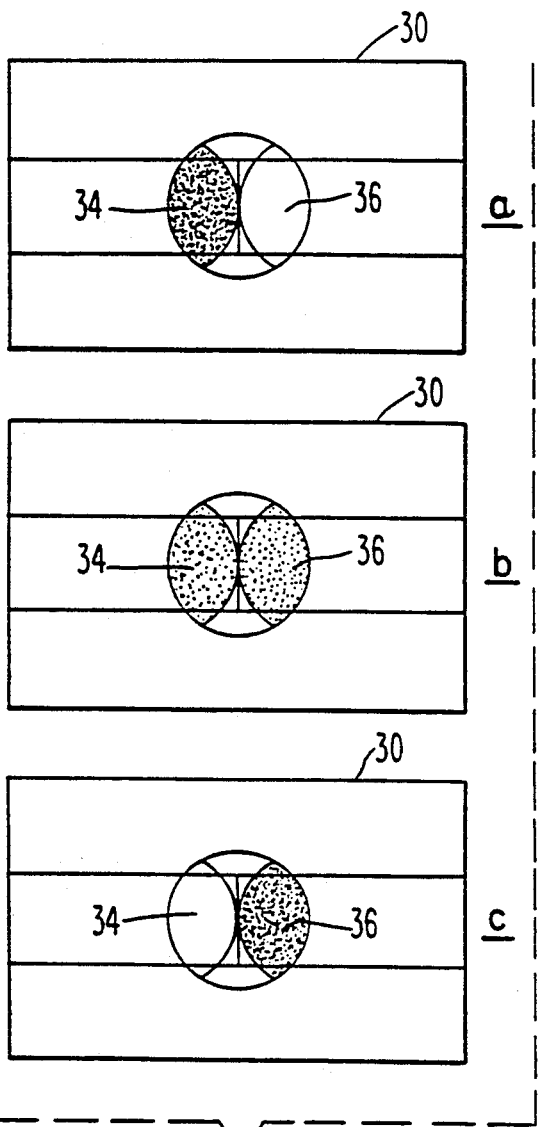
FIG. 3a, 3b and 3c are alternative views of the servo detector shown in FIG. 2.
Figure 4:
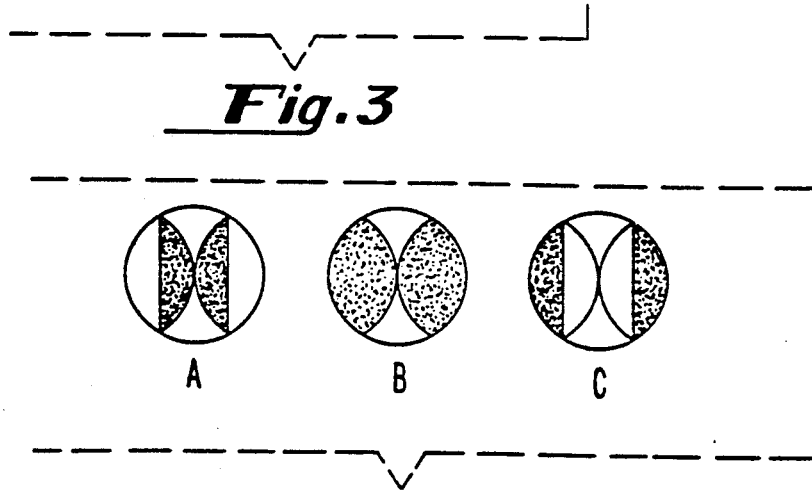
FIG. 4a, 4b and 4c are inteferograms showing various focus conditions.

Consider for example the interferograms shown in FIG. 4. Interferogram 4b corresponds to the interferogram shown in FIG. 2, i.e., the interferogram is representative of the beam of light focused by lens 28 being in the center of track 18b. However, FIG. 4b is also representative of the light beam being focused on the surface of disk 10. It will be recalled that as the light beam goes in and out of focus, i.e., the focal point of the light beam is either above or below the surface of disk 10, the interferogram will get larger or smaller in diameter. The previous detector shown in FIGS. 2 and 3 sense the diameter of the interferogram in relation to providing a coarse focusing signal. However, a second phenomena is occurring. As shown in FIGS. 4a and 4c, the previous detectors would indicate that these interferograms showed a nearly focused light beam. In FIG. 4a the focal point is beneath the surface of disk 10 a few micrometers, while FIG. 4c depicts the focal point being a few micrometers above disk 10. Prior detectors are insufficiently sensitive to sense this fine focus condition.

As shown in FIG. 6, detector 44 includes six photodetectors, wherein each photodetector includes a photosensitive surface which serves to convert light into an electrical signal. By examining the differences between photodetectors B and C and photodetectors D and E, the fine focused conditions shown in FIGS. 4a, 4b and 4c can be distinguished.

Figure 5:
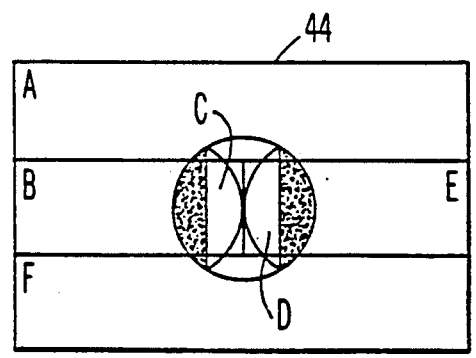
FIG. 5 is a plan view of the detector in accordance with the present invention.

For example, referring to FIG. 5, it will be seen that the brightest of the light detected by photodetector E and B will be different than the brightness detected by photodetectors C and D. Thus, the condition wherein the focal point of the light is above disk 10 can be detected.

Consequently, it will be seen that detector 44 includes a first photosensitive member, photodiodes C and D, for detecting the brightness of light in a portion of the overlapped region between the zero width and first order reflections. This overlap region occurs in the center of the spot. Detector 44 is also seen to include a second photosensitive member, photodetectors D and E, for detecting the brightness of light in the remainder of the overlap region. The brightness is detected between these two regions are compared by any known means, such as amplifier 42, wherein the signals generated by photodetectors C and D are connected to the positive input of amplifier 42 and wherein the signals generated by photodetectors B and E are connected to the negative input of amplifier 42. Thus, the brightness detected between the center portion and the remainder of the overlap region are compared. Alternatively, it could be said that the fine focus is determined according to the following formula:

$$FE_1 = (C+D) - (B+E)$$

where $FE_1$ is the fine focus error signal.

It will also be seen in FIG. 6 that a third pair of photodetectors, photodetectors A and F, are positioned on opposite sides of photodetectors C and D and B and E such that the other photodetectors are contained between photodetectors A and F. From this arrangement, the size of the light spot can be monitored and a coarse focus signal can be generated an, accordance with the following formula:

$$'FE_2 = (A+F) - (B+C+D+E)$$

It will also be noted that detector 44 can be utilized to generate a radial position error signal. Such radial position error signal is generated in accordance with the following formula:

$$PE = (B+C) - (D+E)$$

where PE is the radial position error signal.

Thus it has been shown that the present invention can utilize a combination of spot size detection and detection of the overlap areas for both focus and radial positioning.

In view of the above, it will be understood that detector 44 can be used to generate a coarse focus error signal, a fine focus error signal and a radial position error signal by combining the signals generated by each of the photodiodes according to the formulas described here above.

While the invention has been described and illustrated with reference to specific embodiments, those skilled in the art will recognize that modification and variations may be made without departing from the principles of the invention as described herein above and set forth in the following claims.

What is claimed is:

1. A detector for detecting the focus of a beam of light directed on grooved optical media, wherein light reflected from said media has a number of orders of reflection forming a sheared interferogram, and wherein overlapping regions are generated between said orders of reflection in said interferogram, comprising:

light receiving means for receiving light reflected from said media and for directing said light onto detector means; and detector means, positioned to receive light directed by said light receiving means, for detecting differences in the brightness of light across said overlapping regions.

2. The detector of claim 1, wherein said number of orders of reflection includes at least the zeroth order and portions of the first orders and wherein said detector means comprises, a first photosensitive means for detecting the brightness of light in a portion of the overlap region between said zeroth and first order reflections, a second photosensitive means for detecting the brightness of light in the remainder of the overlap region between said zeroth and first order reflections, and comparator means for comparing the brightness detected between the portion and the remainder of said overlap region.

3. The detector of claim 2, wherein said first photosensitive means comprises a first pair of photodetectors positioned to detect the center of said interferogram and wherein said second photosensitive means comprises a second pair of photodetectors positioned to detect the outer portions of said overlap region between said zeroth and first order reflections.

4. The detector of claim 3, further comprising a third photosensitive means comprising a third pair of photodetectors positioned on opposite sides of said first and second photosensitive means, so that said first and second photosensitive means are contained between said third pair of photo detectors.

5. The detector of claim 4, wherein each of the photodetectors generates an electrical signal representative of the light detected by the photodetector, wherein said first pair of photodetectors is designated C and D, said second pair of photodetectors is designated B and E and said third pair of photodetectors is designated A and F, and wherein the fine focus of said light is determined according to the formula:

$$FE = (C+D) - (B+E).$$

6. The detector of claim 5, wherein the course focus of said light is determined according to the following formula:

$$FE = (A+F) - (B+C+D+E).$$

7. The detector of claim 5, wherein a position error signal is determined according to the formula:

$$PE = (B+C) - (D+E).$$

8. A method for detecting the focus of a beam of light directed on grooved optical media, wherein light reflected from said media has a number of orders of reflection forming a sheared interferogram, and wherein overlapping regions are generated between said orders of reflection in said interferogram, comprising the steps of:

receiving light reflected from said media;
detecting differences in the brightness of light across said overlapping regions.

9. The method of claim 8, wherein said number of orders of reflection includes the zeroth and first orders and wherein said step of detecting comprises the steps of, detecting the brightness of light in a portion of the overlap region between said zeroth and first order reflections, detecting the brightness of light in the remainder of the overlap region between said zeroth and first order reflections and comparing the brightness detected between the portion and the remainder of said overlap region.

10. The detector of claim 9, wherein the step of detecting the brightness of light in a portion of the overlap region comprises the step of detecting the center of said interferogram and wherein the step of detecting the brightness of light in the remainder of the overlap region comprises the step of detecting the outer portions of said overlap region between said zeroth and first order 'reflections.

11. The method of claim 10, wherein the step of comparing the brightness detected between the portion and the remainder of said overlap region comprises the step of subtracting the brightness detected in said outer portion from the brightness detected in said center.

12. The apparatus of claim 1, wherein said interferogram forms a spot on said detector, wherein said spot has a size and wherein said detector means also detects said spot size.

* * * * *